(12) United States Patent
Lin

(10) Patent No.: US 9,464,650 B2
(45) Date of Patent: Oct. 11, 2016

(54) FASTENING DEVICE HAVING A TUBULAR SLEEVE MEMBER FOR MOUNTING ON A TUBE OR IMMOBILIZING TWO TELESCOPICALLY CONNECTED TUBES

(71) Applicant: Chien-Ting Lin, Santa Fe Springs, CA (US)

(72) Inventor: Chien-Ting Lin, Santa Fe Springs, CA (US)

( * ) Notice: Subject to any disclaimer, the term of this patent is extended or adjusted under 35 U.S.C. 154(b) by 0 days.

(21) Appl. No.: 14/990,521

(22) Filed: Jan. 7, 2016

(65) Prior Publication Data

US 2016/0215802 A1    Jul. 28, 2016

(51) Int. Cl.
*F16B 7/14*    (2006.01)

(52) U.S. Cl.
CPC .................. *F16B 7/1418* (2013.01)

(58) Field of Classification Search
CPC .... F16B 7/1418; F16B 7/1454; F16B 2/065; F16B 2/128; B62J 1/08; B62K 19/36; B62K 21/22; B62K 21/24; F16M 11/245; F16M 11/28; Y10T 403/7058; Y10T 403/7062; Y10T 403/7066; Y10T 403/7067
See application file for complete search history.

(56) References Cited

U.S. PATENT DOCUMENTS

| | | | | |
|---|---|---|---|---|
| 2,710,207 A * | 6/1955 | Mueller | .................. | B62K 19/36 24/279 |
| 5,351,980 A * | 10/1994 | Huang | .................... | B62K 19/36 280/281.1 |
| 6,176,640 B1 * | 1/2001 | Gonczi | ...................... | B62J 1/08 403/12 |
| 6,305,869 B1 * | 10/2001 | Chen | ...................... | B62K 3/002 280/87.041 |
| 6,499,800 B2 * | 12/2002 | Morgan, Jr. | ................ | B62J 1/08 297/195.1 |
| 6,557,878 B2 * | 5/2003 | Chen | ...................... | B62K 19/36 280/226.1 |
| 6,676,095 B2 * | 1/2004 | Dal Pra' | ...................... | B62J 1/08 24/20 LS |
| 6,896,438 B1 * | 5/2005 | Chen | ...................... | B62K 19/36 403/290 |
| 6,948,878 B1 * | 9/2005 | Smith, Jr. | ............... | F16B 2/185 403/110 |
| 7,195,377 B2 * | 3/2007 | Tsai | ....................... | F16M 11/16 362/419 |
| 7,757,582 B2 * | 7/2010 | Kua | ......................... | B62J 11/00 74/551.8 |
| 8,025,455 B2 * | 9/2011 | Huang | ................... | F16B 7/1418 280/287 |
| 8,608,118 B2 * | 12/2013 | Lai | ........................ | F16B 7/1454 248/74.1 |
| 8,646,733 B2 * | 2/2014 | Radzinsky | ................ | A61F 2/76 248/74.1 |
| 9,157,471 B2 * | 10/2015 | Jungeberg | ........... | F16C 11/0604 |
| 2008/0145140 A1 * | 6/2008 | Chen | ...................... | B62K 19/36 403/24 |
| 2008/0298886 A1 * | 12/2008 | Chen | ...................... | B62K 19/36 403/373 |
| 2010/0254756 A1 * | 10/2010 | Chiang | .................. | B62K 19/36 403/373 |
| 2014/0093310 A1 * | 4/2014 | Chen | .......................... | B62J 1/08 403/290 |
| 2014/0294496 A1 * | 10/2014 | Gardiner | ............... | F16B 7/1454 403/374.2 |

* cited by examiner

*Primary Examiner* — Daniel Wiley
(74) *Attorney, Agent, or Firm* — Lin & Associates Intellectual Property, Inc.

(57) ABSTRACT

A fastening device for mounting on a tube includes: a tubular sleeve member adapted to be sleeved around the tube, defining a reception space to snugly receiving the tube and a notch for access into the reception space and having an inner wall surface defining the reception space and formed with a press element; and a fixing element mounted on the sleeve member at the notch such that tightening of the fixing element relative to the sleeve member results in pressing of the press element against the tube to deform the tube to possess an outwardly minor protrusion for abutting against the fixing element, which creates an inwardly dented minor recess on its outer wall surface of the tube.

10 Claims, 6 Drawing Sheets

FASTENING DEVICE HAVING A TUBULAR SLEEVE MEMBER FOR MOUNTING ON A TUBE OR IMMOBILIZING TWO TELESCOPICALLY CONNECTED TUBES

CROSS-REFERENCE TO RELATED APPLICATION

This application claims the priority of Chinese patent application No. 201520055023.2, filed on Jan. 27, 2015, which is incorporated herewith by reference.

BACKGROUND OF THE INVENTION

1. Field of the Invention

The present invention relates generally to a fastening device, and more particularly to a fastening device including a tubular sleeve member for mounting on a tube or for immobilizing two telescopically connected tubes.

2. The Prior Arts

A conventional fastening device, such as a clamp member for holding an article, mounted on a tube may easily fall off in case an external force of relative weight is applied onto the clamp member.

Another conventional fastening device currently available is generally used in a tripod, such as a camera tripod, for telescopically connecting at least two tubes (first and second tubes). The fastening device has different configuration and structures and includes a conventional sleeve member for sleeving around the tubes. A fastener knob is generally used to tighten the sleeve member so as to tightly abut against the tubes, thereby preventing the tubes from disengaging relative to each other. However, it is noted that the conventional sleeve member has only the clamping structure but not mosaic engagement structures. Since a fastener knob is generally used to tighten the sleeve member to abut against the first tube, frequent forceful pull-out and push-in actions of the second tube relative to the first tube results in untimely disengagement the sleeve member and the second and the first tubes relative to one another. Hence, we are encountering presently an urgent task, how to improve the structure of the sleeve member.

In short, the conventional sleeve member for telescopically connecting two tubes will lead to disengagement among them in the time of long use and owing to improper handling or over applied force, and it frequently requires re-assembling of the parts once disengaged.

SUMMARY OF THE INVENTION

A primary objective of the present invention is to provide a fastening device having a tubular sleeve member for securely mounting on a tube or for immobilizing two telescopically connected two tubes.

The fastening device of the present invention for mounting on a first tube, includes: a tubular sleeve member adapted to be sleeved around the first tube, the sleeve member defining a first reception space corresponding to and snugly receiving the first tube and a first notch for access into the first reception space and having an inner wall surface defining the first reception space and formed with a press element; and a first fixing element mounted on the sleeve member at the first notch such that tightening of the first fixing element relative to the sleeve member results in pressing of the press element against the first tube to deform the first tube to possess an outwardly minor protrusion for abutting against the first fixing element, which creates an inwardly dented minor recess on its outer wall surface of the first tube, thereby causing tight engagement of the inner wall surface defining the first reception space and the first tube to prevent untimely removal of the sleeve member from the first tube.

In the fastening device of the present invention, a second tube is inserted telescopically into the first tube, wherein the first tube has a diameter greater than that of the second tube to permit telescopic connection of the latter in the former. The sleeve member further defines a second reception space spatially communication with the first reception space. The fastening device of the present invention is adapted to immobilize second and first tubes securely relative to each other, and includes a tubular sleeve member adapted to be sleeved around the second and first tubes, the sleeve member defining a first reception space corresponding to and snugly receiving the first tube and a second reception space that corresponds to the second tube and that is spatially communication with the first reception space, the sleeve member further defining first and second notches for access into the first and second reception spaces respectively and having an inner wall surface defining the first reception space and formed with a press element, the sleeve member further having first and second through holes aligned with the second notch. The fastening device of the present invention further includes first and second fixing elements mounted on the sleeve member at the first and second notches respectively such that tightening of the first fixing element relative to the sleeve member results in tight engagement of the inner wall surface defining the first reception space and the first tube to prevent untimely disengagement of the sleeve member from the first tube. And the second fixing element including a fixing bolt and a fastener knob. The fixing bolt extending through the second through hole and the first through hole to fasten a fastener knob mounted on a distal end of the fixing bolt such that after tightening the fixing bolt and the fastener knob results in pressing the sleeve member against the second tube so as to immobilize the second tube and the first tube relative to each other.

In the above-mentioned fastening device, tightening of the first fixing element at the first notch results in deformation of the first tube, thereby allowing tight abutment of the sleeve member relative to the first tube.

Preferably, in one embodiment, a planar surface serves as the press element of the sleeve member in the first reception space. In another embodiment, a curved surface serves as the press element of the sleeve member in the first reception space so as to enhance the deformation of the first tube, thereby preventing untimely disengagement of the sleeve member from the first tube.

In other words, the fastening device of the present invention is simple in structure but low in manufacturing cost, and facilitates in easily and swift assembly and provides longer service life.

BRIEF DESCRIPTION OF THE DRAWINGS

The present invention will be apparent to those skilled in the art by reading the following detailed description of a preferred embodiment thereof, with reference to the attached drawings, in which:

FIG. 3A is a fragmentary view of the modified fastening device of the present invention and FIGS. 3A-1 is an enlarged view of an encircled part in FIG. 3A prior to a tightening operation;

FIG. 3B is a fragmentary view of the modified fastening device of the present invention and FIG. 3B-1 is an enlarged view of an encircled part in FIG. 3B after the tightening operation;

FIG. 4A is a fragmentary sectional view of the modified fastening device of the present invention and FIG. 4A-1 is an enlarged view of an encircled part in FIG. 4A prior to a tightening operation;

FIG. 4B is a fragmentary sectional view of the modified fastening device of the present invention and FIG. 4B-1 is an enlarged view of an encircled part in FIG. 4B after the tightening operation;

FIG. 5A is a partal view of a fastening device according to a second embodiment of the of the present invention from a first angle;

FIG. 5B is a partal view of the fastening device according to the second embodiment of the present invention from another angle; and FIG. 6 illustrates how the fastening device of the present invention is applied in a tripod for camera and photography equipment.

DETAILED DESCRIPTION OF THE PREFERRED EMBODIMENTS

The accompanying drawings are included to provide a further understanding of the invention, and are incorporated in and constitute a part of this specification. The drawings illustrate embodiments of the invention and, together with the description, serve to explain the principles of the invention.

Figure 1:
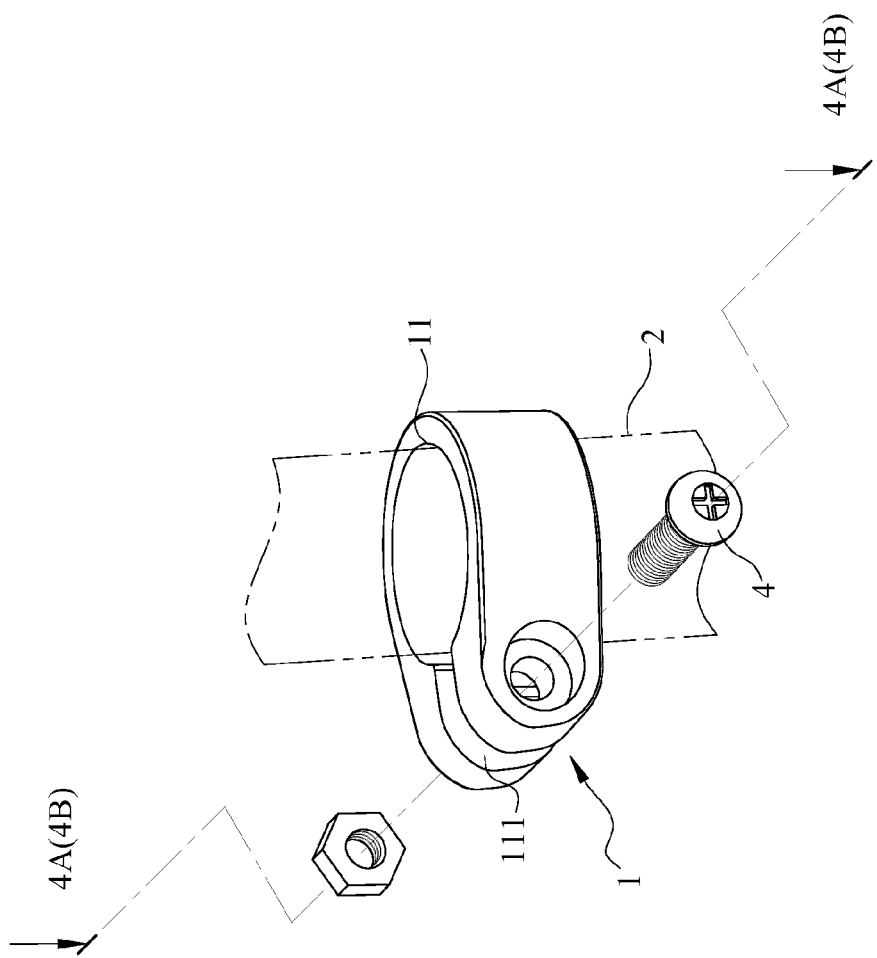
FIG. 1 shows a perspective view of a fastening device of the present invention.

FIG. 1 shows a perspective view of a fastening device of the present invention and. As shown, the fastening device of the present invention is intended for mounting on a first tube 2, includes a tubular sleeve member 1 and a first fixing element 4. The tubular sleeve member 1 is adapted to be sleeved around the first tube 2, defines a first reception space 11 corresponding to and snugly receiving the first tube 2 and a first notch 111 for access into the first reception space 11, and has an inner wall surface that confines the first reception space 11 and that is formed with a press element 112 (see FIG. 4A). The first fixing element 4 is mounted on the sleeve member 1 at the first notch 111 such that tightening of the first fixing element 4 relative to the sleeve member 1 results in pressing of the press element 112 (see FIG. 4A) against the first tube 2 to deform the first tube 2 to possess an outward minor protrusion 22 (see FIG. 4B) for abutting against the first fixing element 4, which creates an inwardly dented minor recess 21 (see FIG. 3B) on its outer surface, thereby causing tight engagement between the inner wall surface confining the first reception space 11 of the sleeve member 1 and the first tube 2. At this time, the sleeve member 1 is prevented untimely removal from the first tube 2. To be more specific, the first fixing element 4 is constituted by a locking bolt and a fastener nut.

Figure 2:
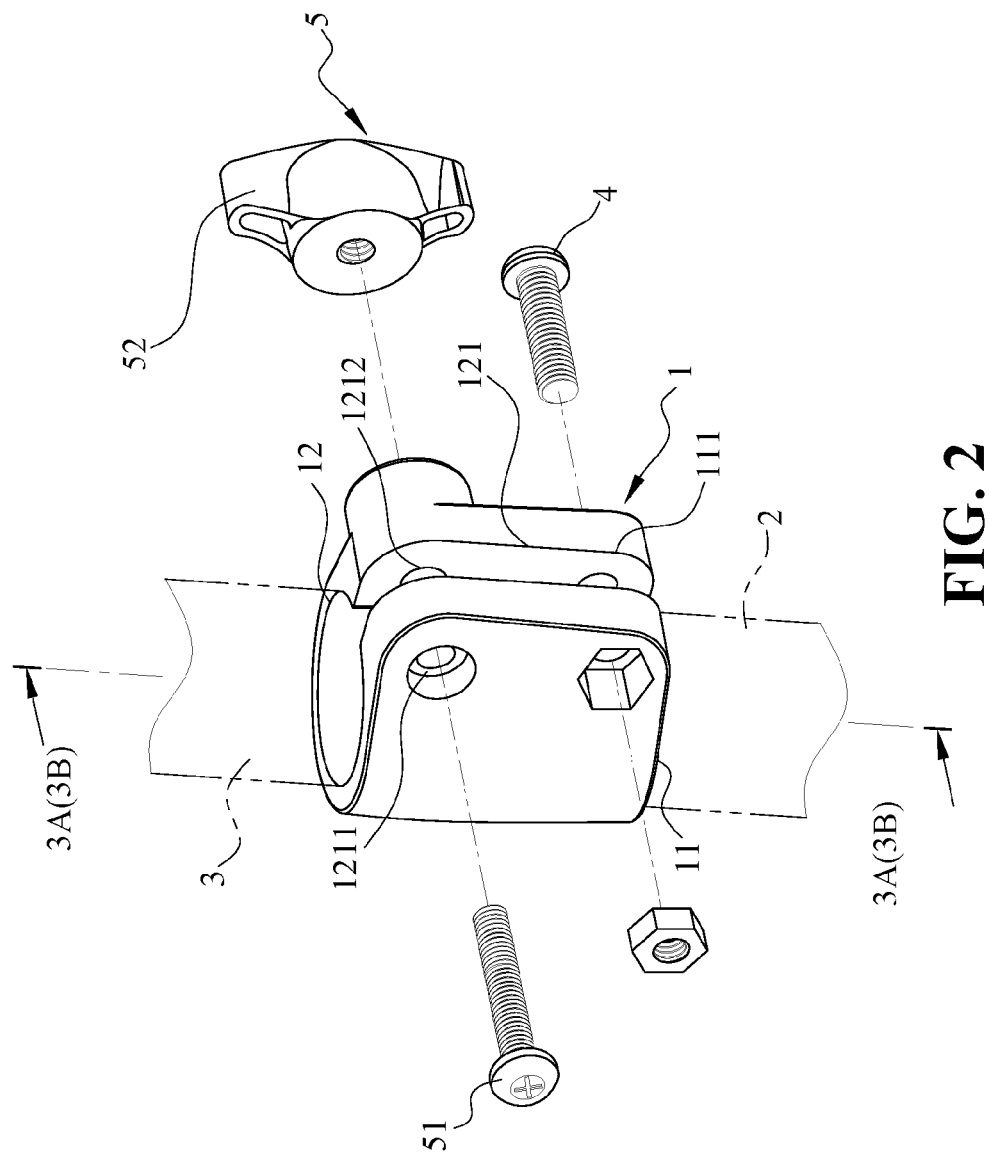
FIG. 2 illustrates a modified fastening device of the present invention in application.

FIG. 2 illustrates a modified fastening device of the present invention in application. As shown, in the modified fastening device of the present invention, a second tube 3 is inserted telescopically into the first tube 2, wherein the first tube 2 has a diameter greater than that of the second tube 3 to permit telescopic connection of the latter in the former. The sleeve member 1 further defines a second reception space 12 that corresponds to the second tube 3 and that is spatially communication with the first reception space 11.

The fastening device of the present invention is adapted to immobilize second and first tubes 3, 2 securely relative to each other, and includes a tubular sleeve member 1 adapted to be sleeved around the second and first tubes 3, 2, the sleeve member 1 defining a first reception space 11 corresponding to and snugly receiving the first tube 2 and a second reception space 12 that corresponds to the second tube 3 and that is spatially communication with the first reception space 11 the sleeve member 1 further defining first and second notches 111, 121 for access into the first and second reception spaces 11, 12 respectively and having an inner wall surface defining the first reception space 11 and formed with a press element 112 (see FIG. 4A), the sleeve member 1 further having first and second through holes 1211, 1212 aligned with the second notch 121. The fastening device of the present invention further includes first and second fixing elements 4, 5 mounted on the sleeve member 1 at the first and second notches 111, 121 respectively such that tightening of the first fixing element 4 relative to the sleeve member 1 results in tight engagement of the inner wall surface defining the first reception space 11 and the first tube 2 to prevent untimely disengagement of the sleeve member 1 from the first tube 2. And the second fixing element 5 including a fixing bolt 51 and a fastener knob 52. The fixing bolt 51 extending through the first through hole 1211 and the second through hole 1212 to fasten a fastener knob 52 mounted on a distal end of the fixing bolt 51 such that after tightening the fixing bolt 51 and the fastener knob 52 results in pressing the sleeve member 1 against the second tube 3 so as to immobilize the second tube 3 and the first tube 2 relative to each other.

Figure 3A:
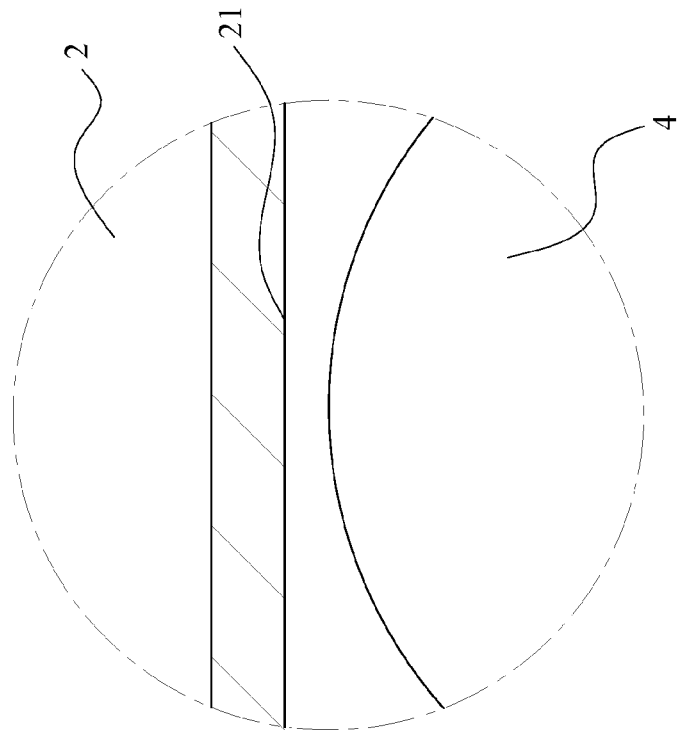
Figures 1, 3A:
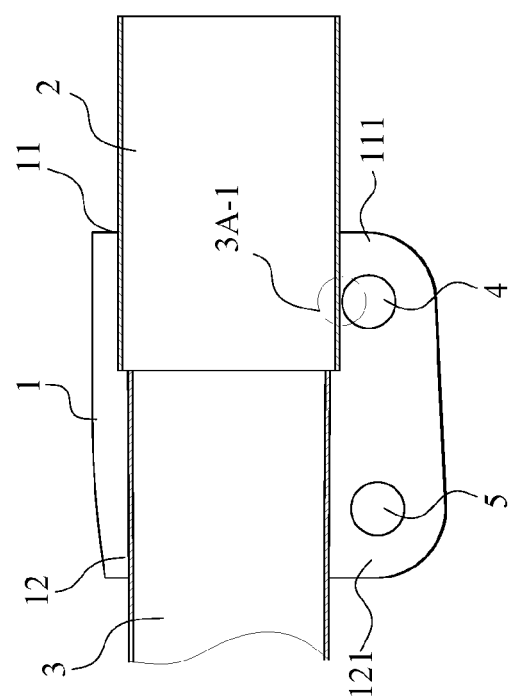
Figure 3B:
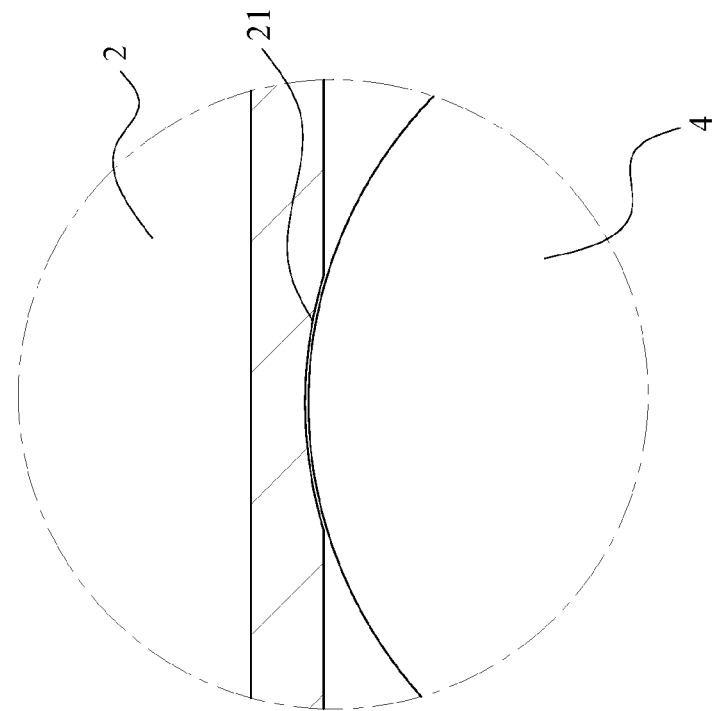
Figures 1, 3B:
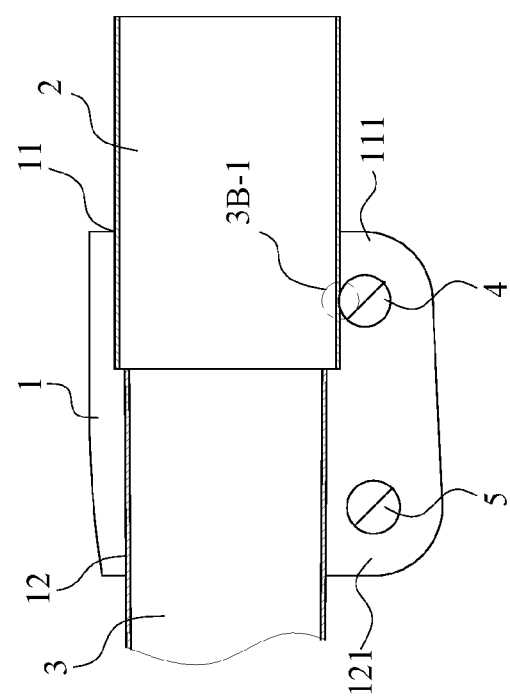
Figure 4A:
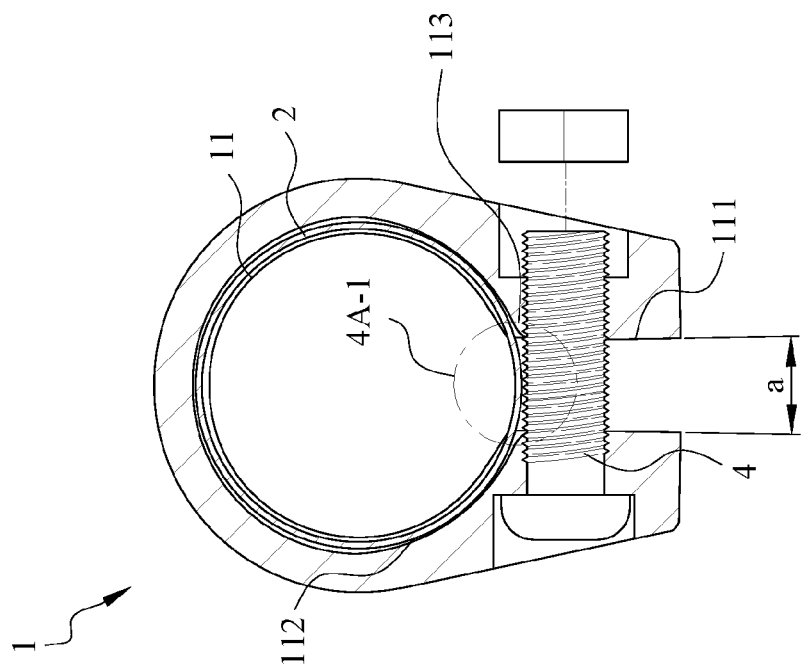
Figures 1, 4A:
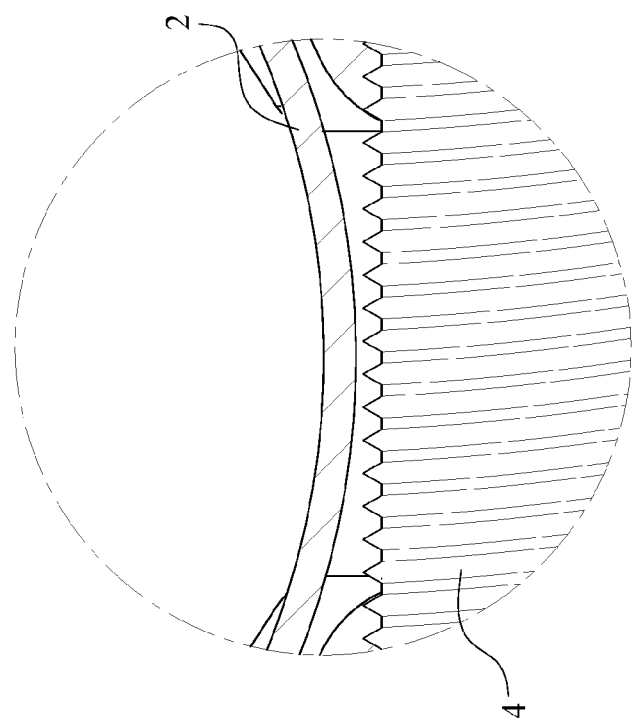
Figure 4B:
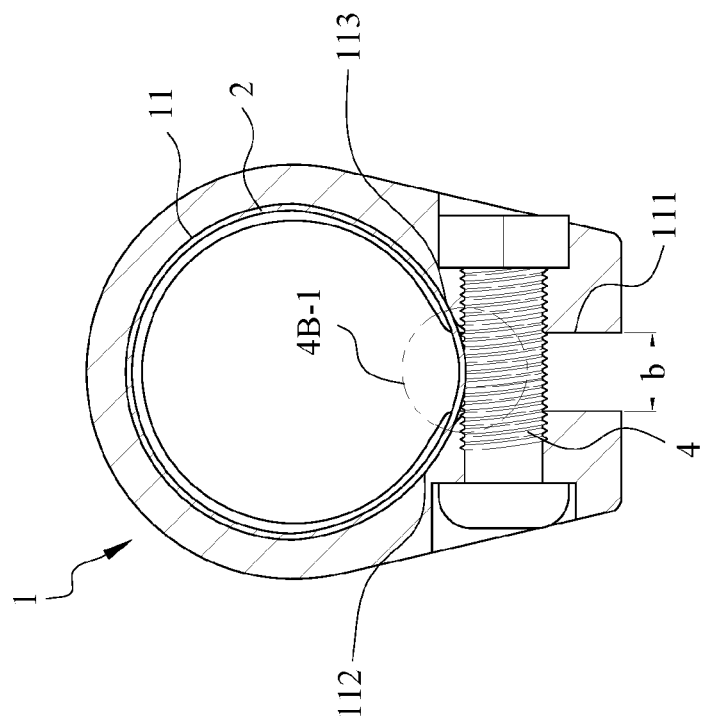
Figures 1, 4B:
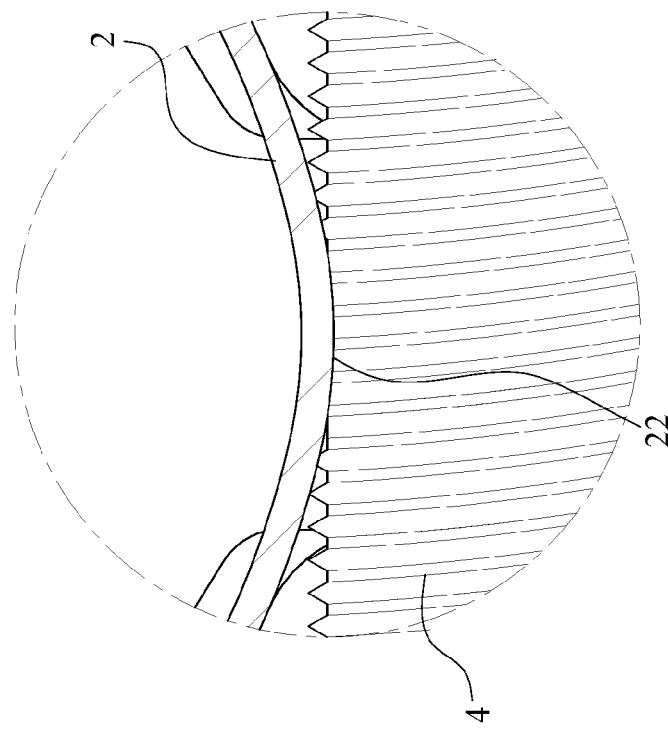

Referring to FIGS. 3A and 3B, wherein FIG. 3A is a fragmentary view of the modified fastening device of the present invention taken from section line 3A(3B) in FIG. 2 and FIG. 3A-1 is an enlarged view of an encircled part in FIG. 3A prior to a tightening operation; and FIG. 3B is a fragmentary view of the modified fastening device of the present invention taken from section line 3A(3B) in FIG. 2 and FIG. 3B-1 is an enlarged view of an encircled part in FIG. 3B after the tightening operation. As illustrated, tightening of the first fixing element 4 relative to the sleeve member 1 results in narrowing the first notch 111 and simultaneously causes pressing of the press element 112 of the sleeve member 1 against the first tube 2 to deform the first tube 2 to possess an outwardly projecting protrusion 22 for abutting against the first fixing element 4, which creates an inwardly dented minor recess 21 on its outer wall surface of the first tube 2, thereby causing tight engagement of the inner wall surface confining the first reception space 111 in the sleeve member 1 and the first tube 2 to prevent untimely removal the sleeve member 1 from the first tube 2. Referring to FIGS. 4A and 4B, wherein, FIG. 4A is a fragmentary sectional view of the modified fastening device of the present invention taken from section line 4A(4B) in FIG. 1 and FIG. 4A-1 is an enlarged view of an encircled part in FIG. 4A prior to a tightening operation; and FIG. 4B is a fragmentary sectional view of the modified fastening device of the present invention taken from section line 4A(4B) in FIG. 1 and FIG. 4B-1 is an enlarged view of an encircled part in FIG. 4B after the tightening operation. As illustrated, in order to enhance the tightening effect, a curved surface or a planar surface serves as the press element 112 of the sleeve member 1. Under this condition, tightening of the first fixing element 4 relative the sleeve member 1 results in narrowing the first notch 111 from a distance "a" to "b" and simultaneously causing pressing of the press element 112 against the first tube 2 to deform the first tube 2 to possess an and inwardly dented minor recess 21 on its outer wall surface for abutting against the first fixing element 4, thereby pressing tightly the inner wall surface confining the first reception space 111 in the sleeve against the first tube 2. By virtue of the inwardly dented minor recess 21 on the outer wall surface of the first tube 2 and the first fixing element 4, the sleeve member 1 is prevented from disengagement from the first tube 2.

More preferably, in this embodiment, a sharp press element 113 (see FIG. 4B) is formed on the inner wall surface of the sleeve member 1 at adjoining area between the first reception space 111 and the first notch 11 so as to further enhance the tightly abutment of the sleeve member 1 relative to the first tube 2. Since the prior art sleeve member is not provided with a press element on its inner wall surface, tightening of a fixing element relative to the prior art sleeve member does not facilitate deformation of the first tube during the application. In the sleeve member of the present invention, even a planar surface can serve as the press element so long as its configuration can create tight abutment between the sleeve member 1 and the first tube 2.

Referring to FIGS. 5A and 5B, wherein FIG. 5A is a partly view of a fastening device according to a second embodiment of the present invention from a first angle; and FIG. 5B is a partly view of the fastening device according to the second embodiment of the present invention from another angle. The second embodiment has the structure generally similar to the modified embodiment except in that the first tube 2 has an outer wall surface formed with a minor recess 211 or a minor hole in advance corresponding to the first fixing element 4 so as to facilitate a swift deformation of the first tube 2 when tightening the first fixing element 4 relative to the sleeve member 1 (not visible in the drawing).

FIG. 6 illustrates how the fastening device of the present invention is applied in a tripod for camera and photography equipment or an astronomical telescope stand. When applying the fastening device of the present invention to a camera tripod 100, the sleeve member 1 as well as the first and second fixing elements 4, 5 are disposed around the first and second tubes of the tripod in such a manner that first of all tightening of the first element 4 relative to the sleeve member 1 is conducted so as to prevent disengagement of the sleeve member 1 from the second and first tubes. After tightening of the fixing bolt 52 relative to the faster knob 53 is conducted so as to press the sleeve member 1 against the second tube 3 so as to immobilize the first and second tubes 2, 3 relative to each other. Under this condition, the user can mount his camera and photography equipment or astronomical telescope on the head of the second tube 3.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A fastening device for mounting on a first tube, comprising:
    a tubular sleeve member adapted to be sleeved around the first tube, said sleeve member defining:
        a first reception space corresponding to and snugly receiving the first tube:
        a first notch in an outer periphery of the sleeve member for access into said first reception space;
        an inner wall surface defining said first reception space; and
        a press element disposed radially between the inner wall surface and the first tube; and
    a first fixing element mounted on said sleeve member across said first notch such that tightening of said first fixing element relative to said sleeve member results in pressing of said press element against the first tube to deform the first tube so as to possess an outwardly minor protrusion, said protrusion abutting against said first fixing element so as to create an inwardly dented minor recess on an outer wall surface of the first tube, whereby the engagement of the inner wall surface and the first tube prevents untimely removal of said sleeve member from the first tube.

2. The fastening device according to claim 1, wherein a second tube is inserted telescopically into the first tube, wherein the first tube has a diameter greater than that of the second tube to permit telescopic connection of the latter in the former.

3. The fastening device according to claim 2, wherein said sleeve member further defines a second reception space spatially communicating with the first reception space, the sleeve member further defining a second notch for access into said first reception space and said second reception space, the fastening device further comprising a second fixing element mounted on the sleeve member at said second notch such that tightening of the second fixing element relative to the sleeve member results in immobilizing the second and first tubes relative to each other.

4. The fastening device according to claim 1, wherein said first fixing element comprises a fastener knob and a fixing bolt.

5. The fastening device according to claim 1, wherein said first fixing element comprises a locking bolt and a fastener nut.

6. The fastening device according to claim 1, wherein said press element of said sleeve member comprises a planar surface.

7. The fastening device according to claim 1, wherein said press element of said sleeve member comprises a curved surface.

8. The fastening device according to claim 1, wherein the first tube has an outer wall surface formed with a minor recess corresponding to said first fixing element.

9. The fastening device according to claim 1, wherein the first tube has an outer wall surface formed with a minor hole corresponding to said first fixing element.

10. The fastening device according to claim 1, wherein a sharp press element is formed on said inner wall surface of said sleeve member at an adjoining area between said first reception space and said first notch.

* * * * *